United States Patent [19]
Grove et al.

[11] Patent Number: 5,659,754
[45] Date of Patent: Aug. 19, 1997

[54] METHOD AND APPARATUS FOR AN IMPROVED OPTIMIZING COMPILER

[75] Inventors: Daniel D. Grove, Mountain View, Calif.; David C. Schwartz, San Antonio, Tex.

[73] Assignee: Sun Microsystems, Inc., Mountain View, Calif.

[21] Appl. No.: 414,267

[22] Filed: Mar. 31, 1995

[51] Int. Cl.⁶ ..................................................... G06F 9/45
[52] U.S. Cl. ........................................................ 395/709
[58] Field of Search ................................... 395/700, 705, 395/707, 709, 800, 377, 395, 392

[56] References Cited

U.S. PATENT DOCUMENTS

| | | | |
|---|---|---|---|
| 4,571,678 | 2/1986 | Chaitin | 395/707 |
| 4,763,255 | 8/1988 | Hopkins et al. | 395/700 |
| 4,782,444 | 11/1988 | Munshi et al. | 395/700 |
| 5,249,295 | 9/1993 | Briggs et al. | 395/650 |
| 5,293,631 | 3/1994 | Rau et al. | 395/700 |
| 5,327,561 | 7/1994 | Choi et al. | 395/700 |
| 5,367,651 | 11/1994 | Smith et al. | 395/700 |
| 5,367,684 | 11/1994 | Smith | 395/700 |
| 5,396,631 | 3/1995 | Hayashi et al. | 395/700 |
| 5,418,958 | 5/1995 | Goebel | 395/700 |
| 5,448,737 | 9/1995 | Burke et al. | 395/700 |

OTHER PUBLICATIONS

Thesis entitled "Register Allocation via Graph Coloring", by Preston Briggs, Rice University, Houston, Texas, Apr. 1992, Title p.–143.

*Primary Examiner*—Alvin E. Oberley
*Assistant Examiner*—Peter J. Corcoran, III
*Attorney, Agent, or Firm*—Erwin J. Basinski

[57] ABSTRACT

An optimizing compiler process and apparatus is disclosed for more accurately and efficiently identifying live variable sets in a portion of a target computer program, so as to more efficiently allocate registers in a computer central processing unit. The process of the invention includes the steps of performing a static single assignment transform to a computer program, including the addition of phi functions to a control flow graph. Basic blocks representing a use of a variable are further added to the control flow graph between the phi functions and definitions of the variables converging at the phi functions. A backward dataflow analysis is then performed to identify the live variable sets. The variables in the argument of phi functions are not included as a use of those variables in this dataflow analysis. The dataflow analysis may be iteratively performed until the live variable sets remain constant between iterations. The apparatus of the present invention includes a computer system having a memory storing a set of variables that are live during the execution of a portion of a computer program. This memory may include CPU registers, cache memory, conventional RAM and other types of memory.

22 Claims, 9 Drawing Sheets

| BLOCK | LIVE SET |
|---|---|
| 12 | Y |
| 14 | $X_2$ |
| 16 | ∅ |
| 18 | ∅ |
| 19 | $X_2$ |
| 22 | ∅ |
| 24 | $X_2$ |
| 26 | ∅ |
| 28 | ∅ |
| 33 | $X_4$ |
| 34 | $X_3$ |
| 36 | $X_1$ |
| 38 | $X_5$ |

FIG. 10A

| BLOCK | LIVE SET |
|---|---|
| 12 | Y |
| 14 | $X_2$ |
| 16 | $X_2$ |
| 18 | ∅ |
| 19 | $X_2$ |
| 22 | $X_5$ |
| 24 | $X_2$ |
| 26 | ∅ |
| 28 | ∅ |
| 33 | $X_4$ |
| 34 | $X_3$ |
| 36 | $X_1$ |
| 38 | $X_5$ |

FIG. 10B

| BLOCK | LIVE SET |
|---|---|
| 12 | Y |
| 14 | $X_2$ |
| 16 | $X_2$ |
| 18 | ∅ |
| 19 | $X_2$ |
| 22 | $X_5$ |
| 24 | $X_2$ |
| 26 | ∅ |
| 28 | ∅ |
| 33 | $X_4$ |
| 34 | $X_3$ |
| 36 | $X_1$ |
| 38 | $X_5$ |

FIG. 10C

METHOD AND APPARATUS FOR AN IMPROVED OPTIMIZING COMPILER

BACKGROUND OF THE INVENTION

1. Field of the Invention

This invention relates to the field of Optimizing Compilers for computer systems. More specifically, the invention is an improved method and apparatus for allocating live variables to available Central Processing Unit ("CPU") registers during the code optimization pass of an optimizing compiler.

2. Background

It is desirable that computer programs be as efficient as possible in their execution time and memory usage. This need has spawned the development of optimizing compilers. Optimizing compilers typically contain a Code Optimization section which sits between a compiler front end and a compiler back end. The Code Optimization section takes as input the "intermediate code" output by the compiler front end, and operates on this code to perform various transformations to it which will result in a faster and more efficient target program. The transformed code is passed to the compiler back end which then converts the code to a binary version for the particular machine involved (i.e. SPARC, X86, IBM, etc). The Code Optimization section itself needs to be as fast and memory efficient as it possibly can be.

For example, most code optimization sections attempt to optimize the usage of the available CPU registers in the target computer. This is done by determining a "live variable set" for the target program using graphing and flow control techniques and rearranging the program code to minimize the number of variables which must be "spilled" into memory from the registers during program execution. This register allocation process involves operating on hundreds of variables in the average target program being compiled and could involve 10 to 20 thousand variables in scientific target programs. Thus in processing this large number of target program variables the code optimizer itself could be excessively time consuming and use memory excessively in making these register allocation calculations if it does not handle the optimizing calculations properly.

In the past, attempts have been made to develop optimizing compilers generally, and code optimizer modules specifically which themselves run as efficiently as possible. A general discussion of optimizing compilers and the related techniques used can be found in the text book "Compilers: Principles, Techniques and Tools" by Alfred V. Aho, Ravi Sethi and Jeffrey D. Ullman, Addison-Wesley Publishing Co 1988, ISBN 0-201-10088-6, especially chapters 9 & 10 pages 513–723. One such attempt at reducing the calculation time of the code optimizer was to reduce the time for calculating "live variable sets" in the register allocation process. Normally, the calculation of the live variables in a control flow graph involves $N^2$ calculations and memory storage space, where N=the number of variables involved. In this attempt at reducing calculation time, an approach to finding the "live variable set" involved the construction of the target's static single assignment ("SSA") graph and the insertion in the graph of special definitions called "Φ functions" or "Φ-nodes" at those points where control-flow paths join and different values merge. This method reduced the calculations for the number of variables from $N^2$ to N, a significant reduction in time and memory usage. This method is described in "Register Allocation via Graph Coloring" by Preston Briggs, PhD. thesis, Rice University April, 1992 which is incorporated herein by reference. However, this method of Briggs produces more variable "spilling" than necessary by making it appear that some variables in the "live set" cannot co-exist in the registers with other variables (thus causing them to spill into memory) when in fact they can.

The present invention uses an elegant method to reduce these erroneous variable spills thereby increasing the target program efficiency with no loss in efficiency in the code optimizer itself.

SUMMARY OF THE INVENTION

The present invention overcomes the disadvantages of the above described systems by providing an economical, high performance, adaptable system and method for minimizing variable spill in the allocation of machine registers to a target program's "live variable set" in an optimizing compiler. In the preferred embodiment, dummy blocks (called "use" blocks) are inserted in the flow graph immediately following a variable definition node. Then the "live variable set" determining process is modified to consider these "use" blocks and not to consider the "Φ functions". This revised process has the effect of minimizing the aforementioned erroneous variable spill.

In one aspect of the present invention a code optimizer for use in a compiler system is provided wherein the code optimizer has portions configured to determine the set of live variables for basic blocks of a target program, and to allocate the CPU registers of a target computer architecture to the set of live variables in a way which minimizes variable spill, wherein said code optimizer inserts, in at least a portion of a control flow graph, dummy blocks representative of a use of a variable in said control flow graph prior to a phi-function node and determines the set of live variables by considering said dummy blocks.

In another aspect of the invention a compiler system is provided wherein a code optimizer portion which generates a second intermediate code representing the target program generates the target program's live variable set according to the above process so as to map this live variable set to the designated CPU registers of a target computer architecture, wherein said code optimizer inserts, in at least a portion of a control flow graph, dummy blocks representative of a use of a variable in said control flow graph prior to a phi-function node and determines the set of live variables by considering said dummy blocks.

In yet another aspect of the invention, a computer system for use in compiling a target program to run on a target computer architecture having a fixed number of CPU registers is provided wherein the computer system includes a compiler system including a code optimizer configured to determine the target program's live variable set according to the above process and to map this live variable set to the designated CPU registers, wherein said code optimizer inserts, in at least a portion of a control flow graph, dummy blocks representative of a use of a variable in said control flow graph prior to a phi-function node and determines the set of live variables by considering said dummy blocks.

Still another aspect of the invention provides computer controlled methods for allocating a set of live variables in a compiler to a designated set of CPU registers in order to optimize the running of a target program, wherein, in at least a portion of a control flow graph, a dummy block representative of a use of a variable in said control flow graph is inserted prior to a phi-function node and wherein the set of live variables is determined by considering said dummy block.

DESCRIPTION OF THE DRAWINGS

The objects, features and advantages of the system of the present invention will be apparent from the following description in which:

FIGS. 10A–C is a chart illustrating sets of live variables for various basic blocks of the program portion represented by the control flow graph of FIG. 9.

NOTATIONS AND NOMENCLATURE

Figure 1:
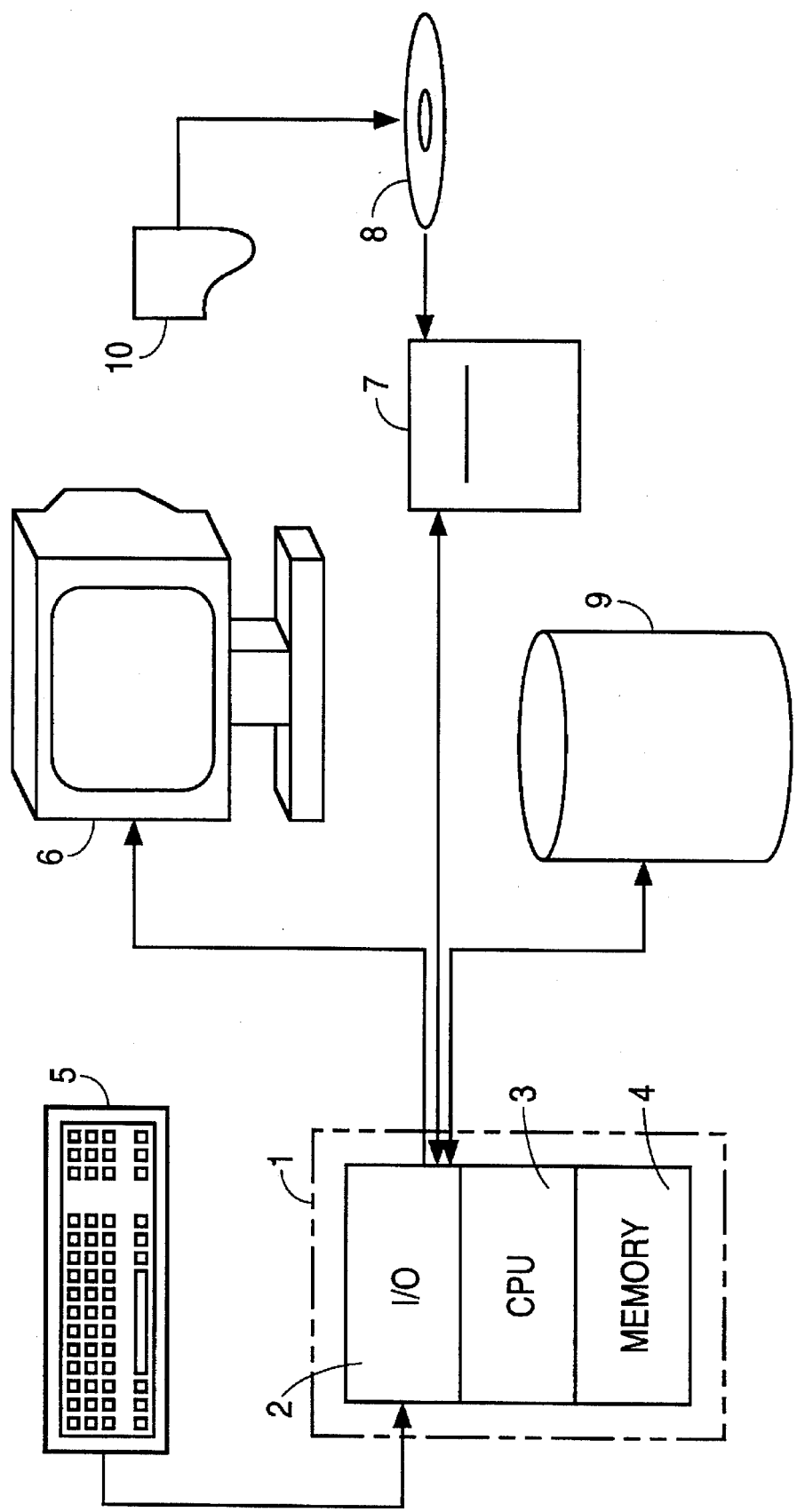
FIG. 1 illustrates a portion of a computer, including a CPU and conventional memory in which the present invention may be embodied.

The detailed descriptions which follow are presented largely in terms of procedures and symbolic representations of operations on data bits within a computer memory. These procedural descriptions and representations are the means used by those skilled in the data processing arts to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be bourne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices. In all cases there should be bourne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Apparatus and methods are disclosed for allocating live variables to available Central Processing Unit ("CPU") registers during the code optimization pass of an optimizing compiler wherein register "spills" of variables are minimized. In the following description, for purposes of explanation, specific instruction calls, modules, etc., are set forth in order to provide a thorough understanding of the present invention. However, it will be apparent to one skilled in the art that the present invention may be practiced without these specific details. In other instances, well known circuits and devices are shown in block diagram form in order not to obscure the present invention unnecessarily. Similarly, in the preferred embodiment, use is made of uni-processor and multi-processor computer systems as well as the Solaris operating system, all of which are made and sold by Sun Microsystems, Inc. However the present invention may be practiced on other computer hardware systems and using other compatible operating systems.

Operating Environment

Figure 2:
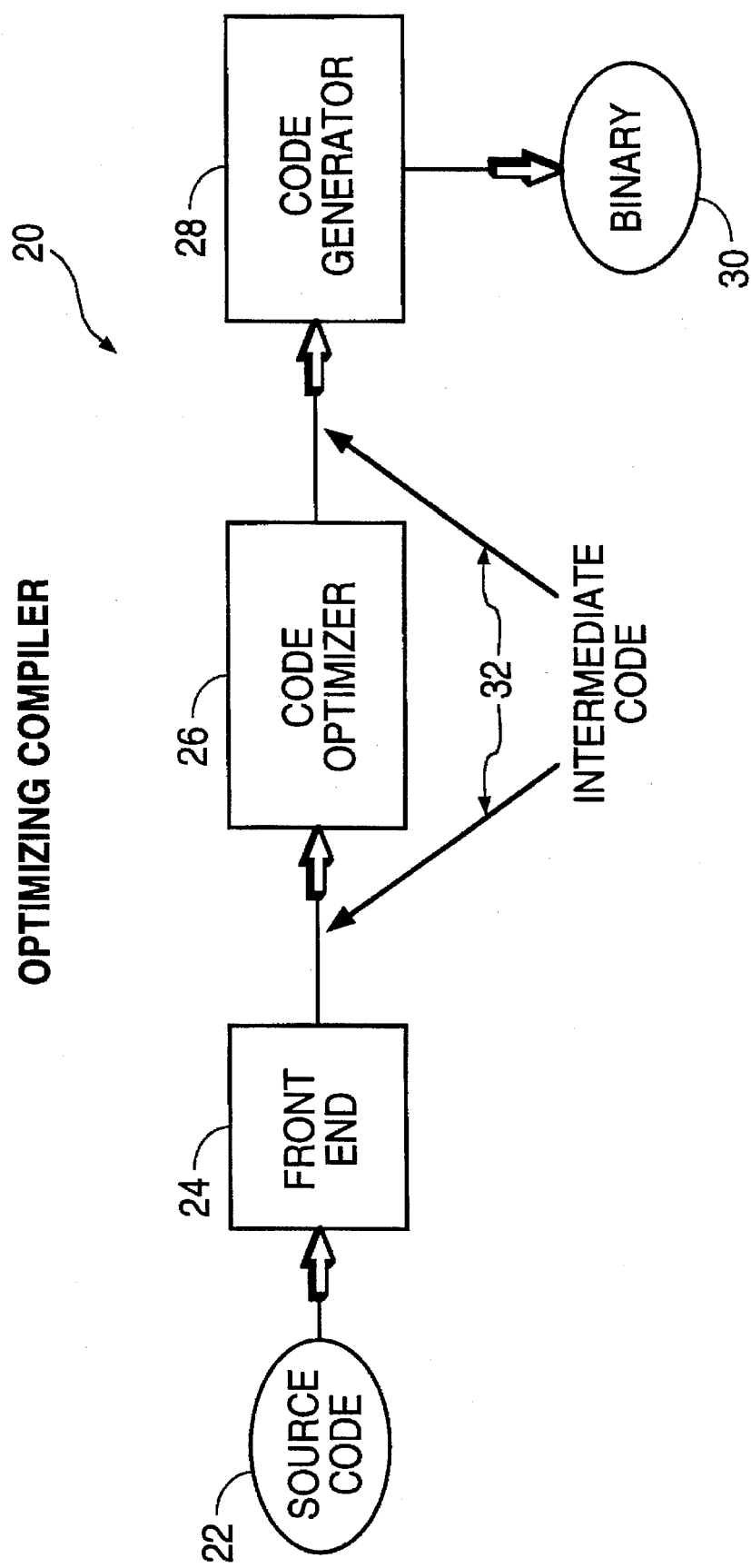
FIG. 2 illustrates a typical compiler showing the position of the code optimizer.

The environment in which the present invention is used encompasses the general distributed computing system, wherein general purpose computers, workstations, or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an Input/output ("I/O") section 2, a central processing unit ("CPU") 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data. FIG. 2 illustrates a typical optimizing compiler 20, comprising a front end compiler 24, a code optimizer 26 and a back end code generator 28. The front end 24 of a compiler takes as input a program written in a source language 22 and performs various lexical, syntactical and semantic analysis on this language outputting an intermediate set of code 32 representing the target program. This intermediate code 32 is used as input to the code optimizer 26 module which attempts to improve the intermediate code so that faster-running machine code will result. Some code optimizers 26 are trivial and others do a variety of computations in an attempt to produce the most efficient target program possible. This latter type are called "optimizing compilers" and include such code transformations as common sub-expression elimination, dead-code elimination, renaming of temporary variables and interchange of two independent adjacent statements as well as register allocation.

Figure 3:
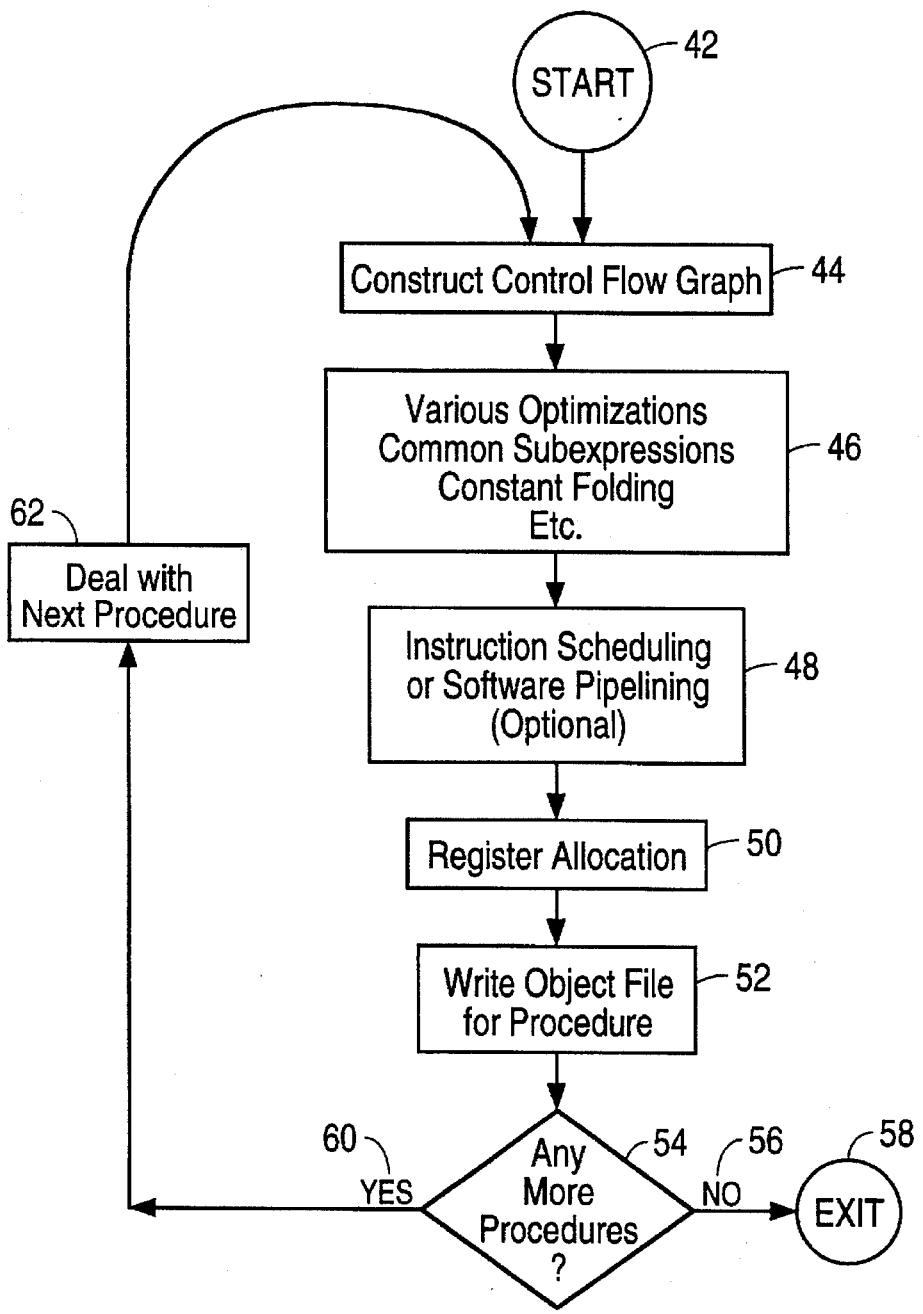
FIG. 3 illustrates a large scale organization of a code optimizer.

FIG. 3 depicts a typical organization of an optimizing compiler 40. On entry of the intermediate code 42 a Control Flow Graph is constructed 44. At this stage the aforementioned code transformations (common sub-expression elimination, dead-code elimination, renaming of temporary variables and interchange of two independent adjacent statements, etc.) take place 46. Instruction scheduling or "pipelining" may take place 48 at this point. Then "register allocation" is performed 50 and the modified code is written out 58 for the compiler back end to convert it to the binary language of the target machine (i.e. SPARC, X86, etc). It is this "Register allocation" 50 process which is the focus of applicants' invention.

Register Allocation

The central processor unit (CPU) of most conventional computers typically includes a set of registers in which various data are stored for rapid access. During execution of a computer program the values of variables present in the program are normally stored in these registers. Modern CPU's normally possess between 32 and 64 floating point registers. While sufficient for many business related application programs, programs related to scientific applications usually employ far more variables than the number of available registers. When too many variables are present in a program, the values of the excess variables are normally stored in cache memory or, alternatively, stored in conventional random access memory Access to the values of variables stored in cache or in conventional memory, however, takes substantially more time than accessing values stored in the registers of the CPU. Typically CPU access to variables that are stored in cache memory is two to three times slower than the time required to access the CPU registers. Access to conventional memory is normally thirty to fifty times slower than CPU register access time. Thus programs tend to execute far more slowly when the values of variables are stored in either cache or conventional memory rather than CPU registers. The storage of variables in cache memory or conventional memory is usually referred to as spill-over.

A substantial amount of engineering effort has been devoted to avoiding or minimizing the affects of spill-over. Often, for example, variables used at the beginning of a program are no longer in use at the end of that program. Thus a CPU register allocated to the storage of values for a variable that is in use only at the beginning of a program may be more efficiently utilized by allocation to a different variable during the execution of the remainder of the program, when the first variable is no longer in use. Variables that are in use during the execution of a portion of a program are often referred to as live while that portion of the program is being executed. By determining the set of variables that are live during the execution of a portion of a program, that is the "live variable set" for that program portion, a more efficient allocation of CPU registers can be made. As each portion of a program is executed, only those variables that are members of the live set for that program portion need be stored in the CPU registers.

Typically advanced analytical processes, such as graph coloring, are used in the prioritization of program variables and the allocation of registers. Examples of these techniques are presented in a paper entitled "Register Allocation And Spilling Via Graph Coloring" in SIGPLAN Notices, 17(6): pages 96–105, June 1982, from the proceedings of the ACM SIGPLAN 1982 Symposium on Compiler Construction. A further survey of graph coloring techniques used in the prioritization of live variables and allocation of CPU registers is disclosed in the aforementioned PhD thesis paper entitled "Register Allocation Via Graph Coloring" by Preston Briggs which is incorporated herein by reference.

While a variety of program variable prioritization processes and register allocation techniques exist, and are in current use today, all of these techniques rely on accurately identifying the live variable set for each of the various portions of a computer program. A variety of different techniques are currently available for determining live variable sets. Unfortunately, however, these conventional techniques are either calculation intensive, inaccurate, or both. An example of one technique for determining live variable sets involves analysis of definition-use chains. Another technique for determining live variable sets involves the analysis of static single assignment ("SSA") transforms of a program. The static single assignment transform technique is usually regarded as having several advantages over the analysis of definition-use chains. Typically the SSA transform tends to grow in size at a slower rate than the definition-use chain as the size of the computer program under analysis increases in size. Optimizing compilers employing SSA transform based processes therefore tend to run faster and consume less memory than those relying on definition-use chain related processes. Several other functions commonly performed by an optimizing compiler, such as value numbering, dead code elimination and constant propagation, can also be performed more efficiently when SSA transforms are employed instead of processes based on definition-use chain types of processes. Unfortunately, however, SSA transforms invariably provide inaccurate results when live variable sets are determined by performing a backwards dataflow analysis on the SSA transform. The present invention provides a more accurate and efficient method of determining live variable sets that is based on SSA transform related methodologies.

Figure 4:
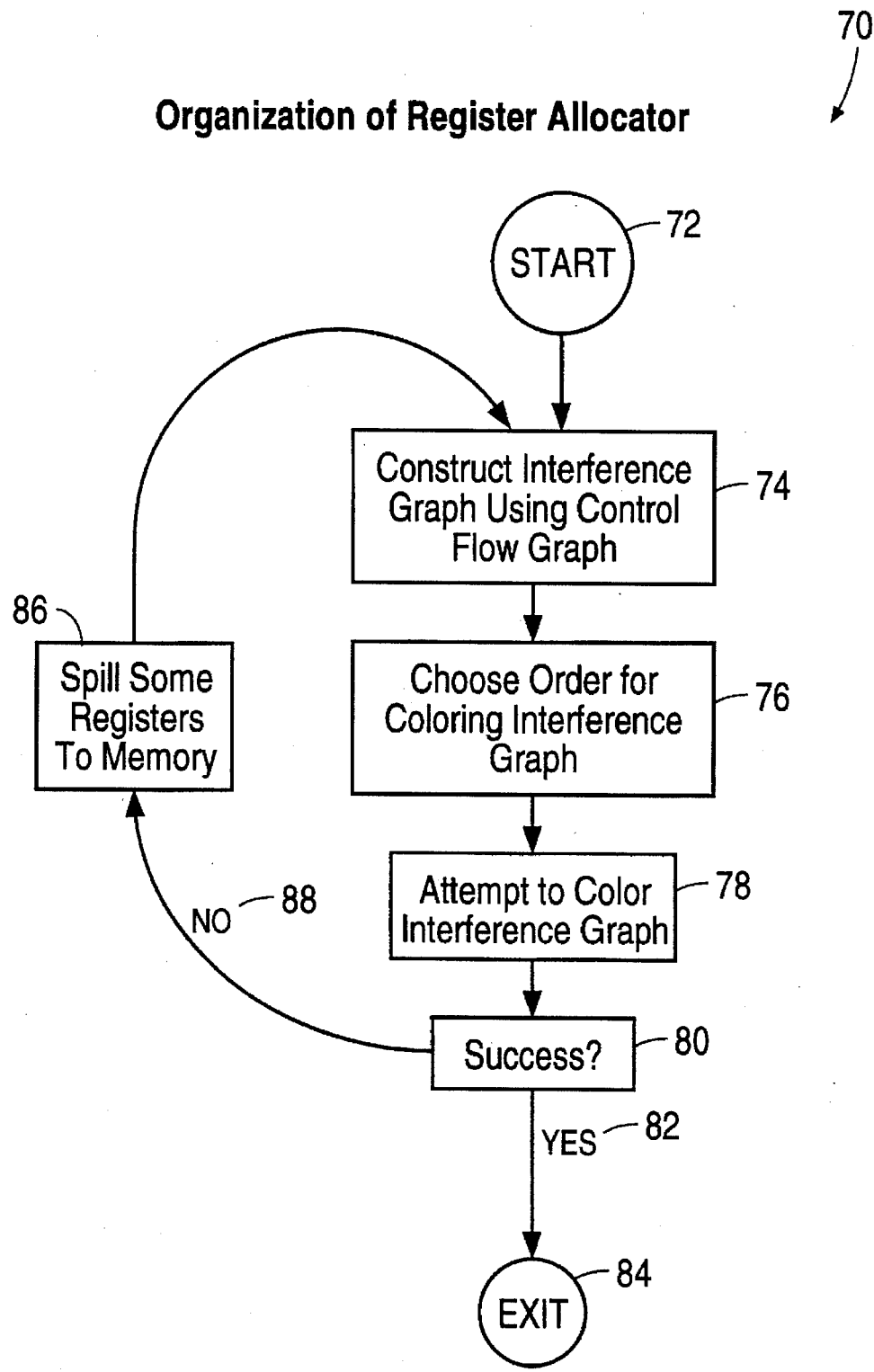
FIG. 4 illustrates an organization of the Register Allocation portion of FIG. 3.

Referring now to FIG. 4 an organization of a typical Register Allocator 70 is shown. This corresponds to block 50 in FIG. 3. On entry to the register allocation routine 72 an "Interference Graph" is constructed using "Control Flow Graph" techniques 74. The "Interference Graph" construction is described in detail below. A "flow graph" is a directed graph the nodes of which are the "basic block" of the target program. A "basic block" is a sequence of consecutive statements in which flow of control enters at the beginning of the block and leaves at the end without halt or the possibility of branching except at the end. Continuing in FIG. 4, after the Interference Graph is constructed 74, an order is chosen for coloring the Interference Graph 76. Then an attempt is made to map the "virtual registers" identified in the Interference Graph into the "physical register" set 78. During this mapping process variables which cannot be mapped into registers are flagged to be "spilled" to memory. "Success" in mapping the identified set of virtual registers is defined as any graph wherein any two adjacent nodes have different colors (i.e. actual registers) for all possible pairs of nodes. So in FIG. 4 the test for "success" 80 is made and if there is success 82 the register allocator routine is exited 84 as all registers have been allocated for the target process with no conflict of variables. If "success" fails 88 the variables which were previously marked to be "spilled" are assigned to memory 86 and the register allocation routine is begun again 74 without the spilled variables. This iterative procedure continues until "success" as defined above is achieved.

Figure 5:
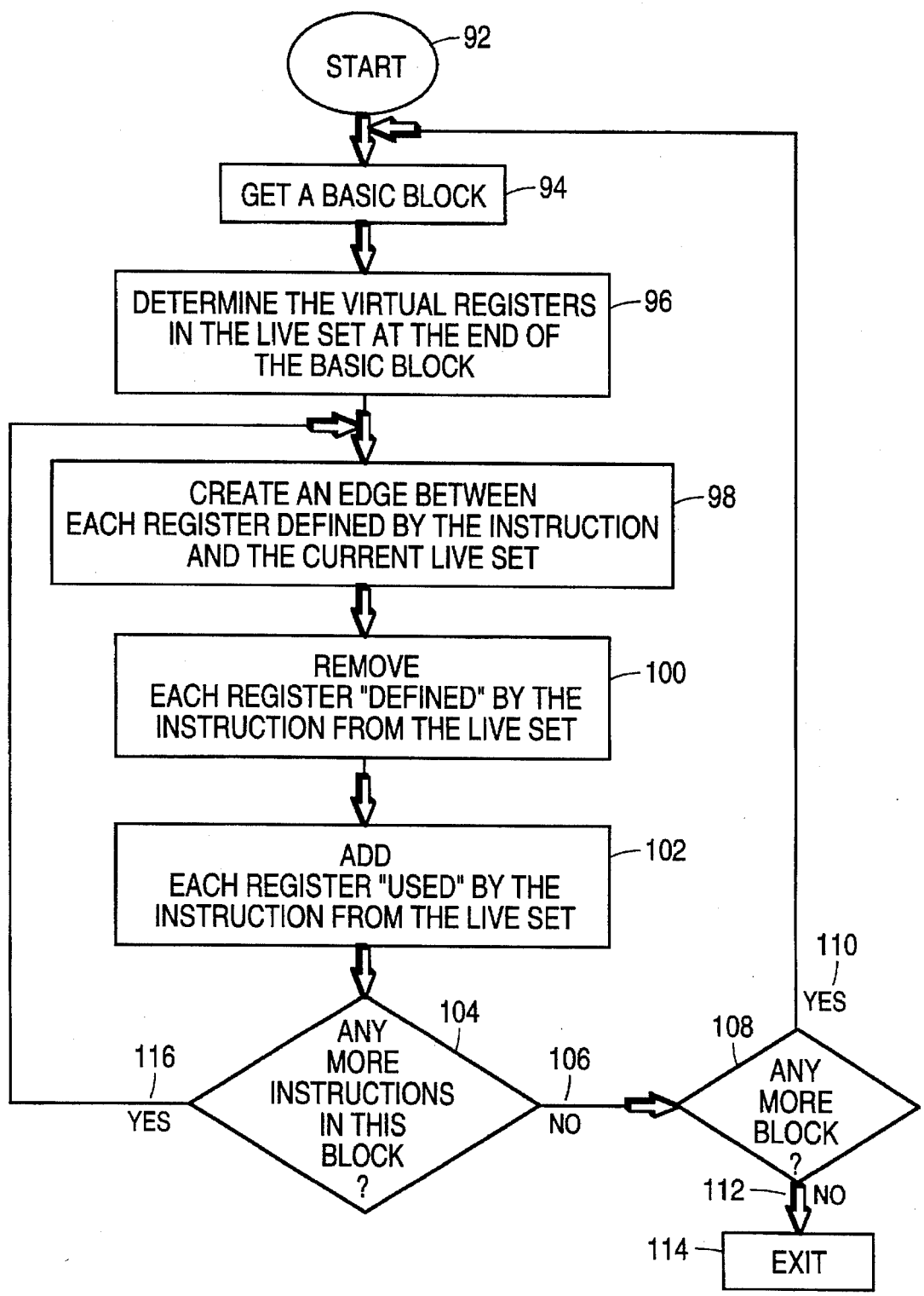
FIG. 5 illustrates a representation of steps in constructing the Interference Graph.

Referring now to FIG. 5 the procedure for constructing the Interference Graph 90 is described. On entry 92 to this routine a first basic block is identified 94. Starting at the end of the basic block, the virtual registers which are currently in the live variable set at the end of the block are determined 96. For each instruction from the end of the basic block, working backward to the start of the block, an edge is created between each virtual register defined by the instruction and the current live variable set 98. Each virtual register "defined" by the instruction is removed from the live variable set 100, and each virtual register "used" by the instruction is "added" to the live variable set 102. This process is performed for each instruction in the block and when there are no more instructions in the block 106 the next block is identified if there are more blocks to complete 110. If all blocks have been so processed 112 the interference graph for this target procedure is completed. At this stage the Interference graph is used to attempt to map the virtual registers in the target procedure into the CPU's physical registers as described above with reference to FIG. 4. In the preferred embodiment of the present invention an improvement is identified in the process of finding the set of live variables at the end of each basic block (block 96 in FIG. 5). This improvement is designed to correct failures in register assignment/mapping which occur when the graph form of the program is in SSA form. Such failures result in certain variables being spilled to memory (thus slowing the target program run time) when there is no need to do so. These improvements are described in the context of the process for finding the variables in each block's live set 120 illustrated in FIG. 6.

Figure 6:
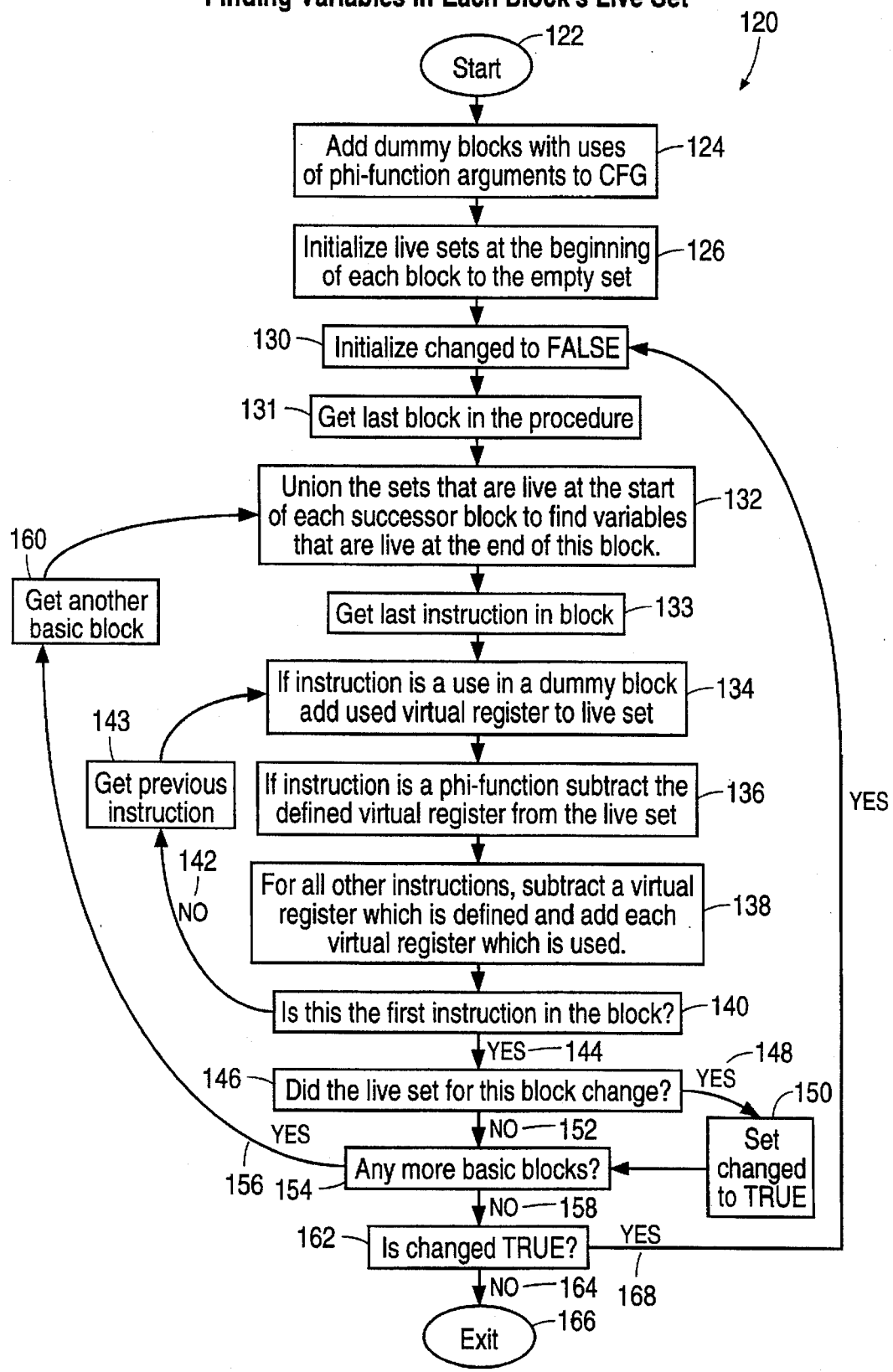
FIG. 6 illustrates a process for finding variables in each block's live set.

Referring now to FIG. 6, the detailed illustration of the process of block 96 of FIG. 5 is shown. On entry to this process 122, dummy blocks with uses of the phi-function (Φ-function) arguments are added to the control flow graph 124. These dummy blocks are added to an edge connected to a Φ-function, prior to the Φ-function block. These Φ-functions are described in more detail below. Next the live sets at the beginning of each block are initialized to the empty set 126. The global change flag which is the general control for this procedure is initialized to FALSE 130. Then starting at the end of the target program and working backwards over each basic block in the target program the process finds variables that are live at the end of the block. This process begins by getting the last block in the procedure 131. In order to determine the current approximation of the set of variables live at the end of a target block, the process unions the sets of variables live at the start of each block that is a successor of the target block in the control flow graph 132. Then working from the last instruction in the basic block 133 to the first instruction in the block, if the instruction is a "use" in a dummy block, the "used" variable (virtual register) is added to the live set 134. If the instruction is a "Φ-function" then the virtual register defined by the Φ-function is subtracted from the live set 136 and the arguments of the Φ-function are not added to the live set. For all other instructions, subtract a virtual register which is "defined" and add a virtual register to the live set if it is "used" 138. If the latest instruction just processed is the first instruction in the block 144 this means that the block is completed. The live set is checked to see if it changed from the start of the processing of this block 146 and if so 148 the global change flag is set to TRUE 150 and control goes to block 154. If the live set did not change 152 a determination is made as to whether there are any more basic blocks to process 154 and if so 156 the process gets another block 160 and the process for this block is repeated beginning at block 132. This process loop on the current block continues until the live set does not change 152 at which time the determination of the set of live variables for this block is done. If there are more blocks to do 156 another block's pointers are obtained 160 and the process is repeated beginning at block 132. If all blocks are completed 158 the change flag is tested 162 and if it is TRUE 168 the process is repeated again from block 130. If the change flag is False 164 the live set determination is complete 166. This process and the process of how the variables change, how the dummy and Φ-function blocks are used are now explained in some detail.

Figure 7:
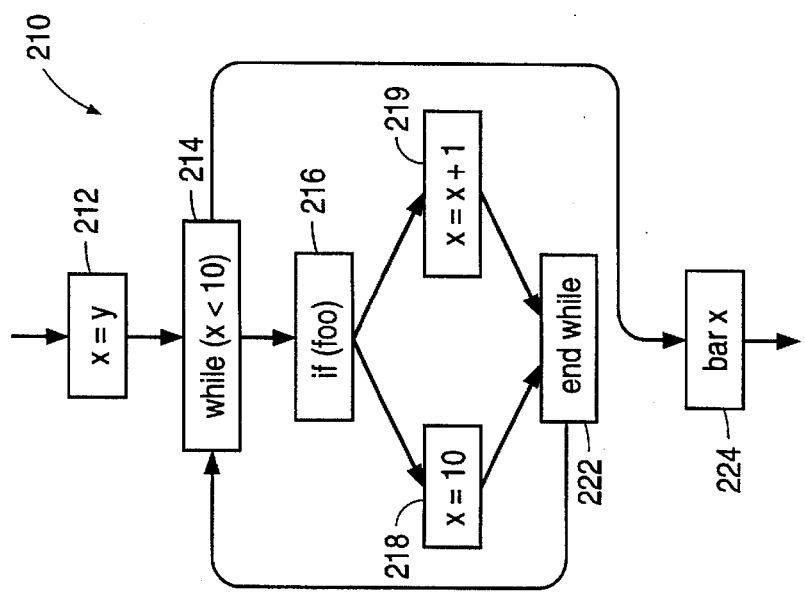
FIG. 7 is an illustrative example of a control flow graph for a portion of a computer program.

Referring to FIG. 7 there is shown a control flow graph 210 for an illustrative portion of a computer program. In accordance with one aspect of the invention, a set of live variables is determined for this, and for every other portion of the program. Once these live variable sets have been determined, a more efficient allocation of CPU registers can then performed. For example, the values of variables that are not in the live variable set of the program portion illustrated in FIG. 7 need not be stored in CPU registers during execution of this portion of the program. In order to determine the live variable sets, the program portion illustrated in the control flow graph 210 of FIG. 7 is first divided into sets of basic blocks. As defined above, a basic block is a portion of code in a computer program having the property that each line of code in the basic block will necessarily be executed if the first line of code in that block is executed. Basic blocks are essentially self contained portions of a program. They do not contain branch instructions to other portions of the program except, perhaps, in a last line in the block.

The program portion illustrated by control flow graph 210 may be considered to have been already partitioned into basic blocks such as blocks 212, 214, 216, 218, 219, 222 and 224. For purposes of explanation, several of the basic blocks 212–224 shown in FIG. 7 include various illustrative definitions and uses of a variable such as X. Thus basic block 212 includes an initial definition X=Y while basic block 219 includes both a definition and a use of a variable with the expression X=X+1. Other basic blocks are seen to include illustrative branching type instructions of the type commonly employed in a variety of computer programming languages. Basic block 214, for example, can be seen to form a loop including blocks 216–222. The conditional "while" statement in basic block 214 and the conditional "if" statement in basic block 216 both provide control flow branchings dependent upon their respective conditional arguments. It will be appreciated by those skilled in the art that the processes and apparatus disclosed herein could also be applied to software programs having basic blocks including the definitions and uses of several more variables. The single variable presented in the exemplary program portion shown in FIG. 7 is for illustrative purposes only, and should not be viewed as any form of a limitation on the invention.

Figure 8:
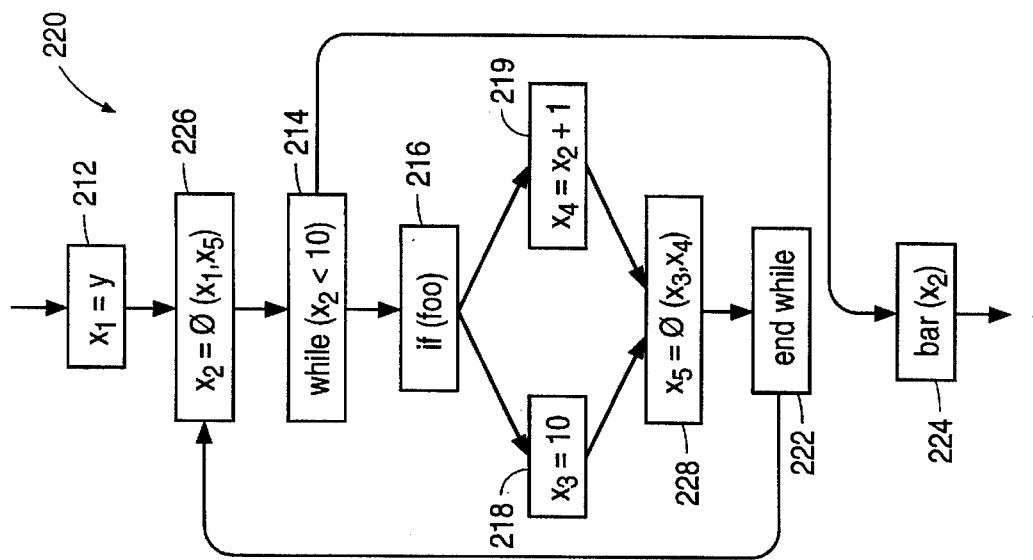
FIG. 8 is a control flow graph for the portion of a computer program illustrated in FIG. 7 after application of a single static assignment transform.

In accordance with one aspect of the invention, a further step in the process of determining live variable sets for the basic blocks 212–224 shown in FIG. 7 involves the application of a static single assignment ("SSA") transform to control flow graph 210. As part of this transform each statement concerning a definition of a variable is renamed to refer to a new variable. In FIG. 8 there is shown a control flow graph 220 for the same program portion represented by the control flow 210 illustrated in FIG. 7. In the control flow graph 220 of FIG. 8 each definitional statement that includes the variable X has been renamed. For illustrative purposes the variable X terminology has been retained, but a numbered subscript has been added to reference the new variable name imparted by the transform. Thus, for example, the definition X=Y in basic block 212 is renamed $X_1$=Y. Similarly the statement X=X+1 in basic block 219 is renamed $X_4$=$X_2$+1.

Along with the renaming of variables, special phi function statements are also added to the program transform. These phi functions are included in the control flow graph 220 wherever two or more differing definitions of the same variable converge in the control flow graph. The phi function is a new "definitional" instance of the variable, with the argument of the phi function including the differing definitions of the variable leading to the phi function. Basic block 214, for example, represents such a convergence in the definitions of X. That is, at basic block 214 the definitions of X in the statement "while (X<10)" can be derived from either the definition of X provided by basic block 212 or alternatively derived from the definition provided by basic block 222. A phi function is therefore inserted in the control flow graph 220 as a basic block 226 located between basic blocks 212 and 214. An additional indexed variable "$X_2$," is provided to represent the new definitional instance of the variable X that has been afforded by the addition of the phi function.

The argument of a phi function is derived from the differing values of the variable that lead to the phi function. Thus one of the arguments for the phi function at basic block 226 is $X_1$, being derived from the definition of $X_1$ at basic block 212. The other portion of the argument of the phi function at basic block 226, however, is derived from basic block 222. As can be seen in FIG. 8, basic block 222 also represents a convergence of differing definitions of the variable X. That is, the definition of X at basic block 222 may be derived from either of basic block 218 with the definition "$X_3$=10" or from basic block 219 with the definition "$X_4$=$X_2$+1". As further shown in FIG. 8, a phi function is therefore also inserted at basic block 228, immediately preceding basic block 222, and provided with a new indexed variable "$X_5$". This new indexed variable $X_5$ in basic block 228 provides a second and final portion of the argument of the phi function in basic block 226. The phi function in basic block 226 can now be completely expressed as "$X_2$=$\Phi(X_1, X_5)$". The arguments for the phi function at basic block 228 are, in turn, provided from the differing definitions of X converging at basic block 228, that is, from basic blocks 218 and 219. Thus, the definition $X_3$=10 in basic block 218 and the definition $X_4$=$X_2$+1 in basic blocks 219 provide the arguments for the phi function at basic block 228, which can thus be fully expressed as $X_5$=$\Phi(X_3, X_4)$.

With the addition of the phi functions to the control flow graph 220 static single assignment transform of the program portion represented by the control flow graph 210 in FIG. 7 is complete. Use of this transform to determine live variable sets, however, has still been found to provide inaccurate results, with an excessive number of variables in the live set that are not, in fact, live. In accordance with a further aspect of the invention, the static single assignment transform of a computer program is further modified with the addition of basic blocks in the control flow graph representing "uses" of the indexed variables in the arguments of the phi functions. Each such "use" block includes a use of just one of the variables found in the argument of the phi function. These use blocks are added to the control flow graph between the phi functions and the differing definitions of the variable converging in the control flow graph at the phi function.

Figure 9:
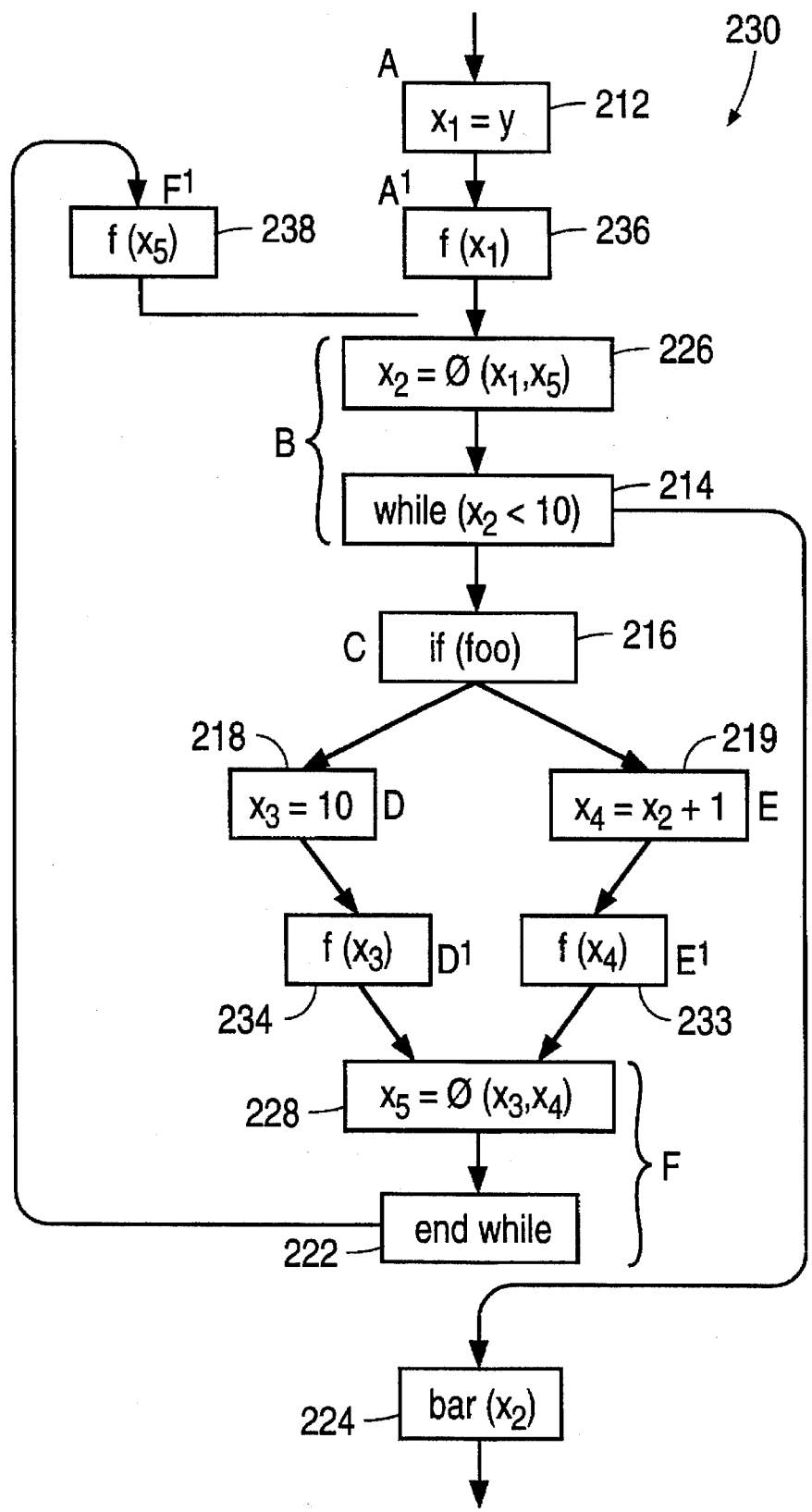
FIG. 9 is a control flow graph for the program portion illustrated in FIG. 7 after execution of a transform in accordance with the process of the present invention.

Referring to FIG. 9 there is shown a control flow graph 230 including use blocks 233, 234, 236 and 238 that were added to the control flow graph 220 of FIG. 8 in accordance with the invention. The phi function of block 228, for example, has the variables $X_3$ and $X_4$ in its argument. Accordingly, use blocks 233 and 234 are added to the control flow graph 230 between the phi function of block 228 and the definitions of $X_3$ and $X_4$ at blocks 218 and 219, respectively. Block 233, having a use f($X_4$) of the variable $X_4$ is thus added to the control flow graph 230 between the phi function of block 228 having $X_4$ in its argument and the definition of the variable $X_4$ (i.e. $X_4$=$X_2$+1) at block 219. Similarly block 234 having a use f($X_3$) of the variable $X_2$ is added between the phi function of block 228 (further having $X_3$ in its argument) and the definition of the variable $X_3$ (i.e., $X_3$=10) at block 218.

Since another phi function is present in the control flow graph 220 at block 226, additional use blocks 236 and 238 are added to the control flow graph 230 between the phi function of block 226 and the definitions of the variables in the argument of that phi function. Block 236 with a use f($X_1$) of the variable $X_1$ is inserted between the phi function $\Phi(X_1, X_5)$ at block 226 and the definition of the variable $X_1$ at block 212. Similarly block 238 with a use f($X_5$) of the variable $X_5$ that is inserted between the phi function of block 226 and the definition of the variable $X_5$ at block 228.

With the addition of the use block 233-238 a backward dataflow analysis may be performed on the control flow graph 230 to determine the live variable sets for each of the basic blocks in the graph. This analysis is preferably performed as an iterative process. In each iteration the process is begun at the end of the basic block In performing this analysis a variable that is used in a basic block is added to the live variable set for that block. If the variable is subsequently defined in the same basic block, however, the variable is then removed from the live set. In accordance with still a further aspect of the invention, a use of a variable in the argument of a phi function does not cause that variable to be added to the live set.

In FIG. 10A there is shown the set of live variables for each of the basic blocks 212-238 in the control flow graph of FIG. 9 after the first iteration of the backward dataflow analysis has been performed. Considering for example basic block 212, the variable Y is added to the live set for block 212 since Y is used in the expression $X_1$=Y. The variable $X_1$ is not added to the live set for basic block 212, however, since $X_1$ is merely defined in block 212. Similarly the live variable set of basic block 219 includes $X_2$ since this variable is used in block 219, but does not include $X_4$ since this variable is only defined in block 219. Basic blocks 216, 218 and 222 can be seen to have empty live variable sets since each of these blocks do not contain any uses of a variable. The only uses of variables in basic blocks 226 and 228 are within the arguments of phi functions and are thus, in accordance with the invention, ignored. Consequently the live variable sets of basic blocks 226 and 228 are also empty. The basic blocks 233-238 were expressly added to the control flow graph 230 to represent uses of various variables, as discussed above. The live set for each of these basic blocks (as shown in FIG. 10A) reflects their express use of the relevant variables. The remaining two basic blocks in control flow graph 230, blocks 214 and 224, each contain a use of the variable $X_2$, as further shown in FIG. 10A.

In accordance with this invention the process of the backward dataflow analysis is preferably iteratively performed. In a second iteration of the backward dataflow analysis of the invention, the live variable sets of the basic blocks immediately subsequent to the basic block under consideration are also considered in the live variable set analysis. These subsequent blocks are normally termed the child blocks, and the basic block immediately prior to the child block is normally termed the parent block. Thus, the union of the live variable sets for the children blocks are also included in the determination of the live variable set for the parent block in the second iteration of the process. This analysis is further preferably initiated at the last basic block, block 224, and proceeds in reverse fashion through the control flow graph, ending with the first basic block, block 212, of the control flow graph 230 shown in FIG. 9.

In FIG. 10B there is shown a live variable set for each of the basic blocks 212–238 in control flow graph 230 after the second iteration of the backward dataflow process of the invention. Beginning with basic block 224 at the end of control flow graph 230, the live set for this block remains unchanged (still containing only a use of $X_2$) since block 224 has no children blocks. The live variable set of basic block 214 also remains unchanged. The variable $X_2$ was already in the live variable set for block 214 after the first iteration of the process because of the use of this variable in the argument of the "while" statement ($X_2<10$). Since $X_2$ is already in the live variable set for block 214 no change is made by consideration of this variable in the live set of block 224, the child to block 214.

By comparison of FIGS. 10A and 10B it can be further be seen that the live variable set of basic block 226 also remains unchanged, although for a markedly different reason. Basic block 214 is the child of block 226. Thus in the second iteration, the variable $X_2$ in the live set of basic block 216 is considered in the determination of the live variable set for block 226. The variable $X_2$ is therefore initially added to the live set of basic block 226, but then subsequently removed since block 226 also contains a definition of the variable $X_2$ in the expression of the phi function $X_2=\Phi(X_1, X_5)$.

In considering basic block 238, the child block 226 of block 238 has been shown to still have an empty live variable set. Thus the live variable set of parent block 238 remains unchanged. The live variable set of basic block 222, however, does change in this second iteration of the process. In the first iteration, block 222 had an empty live variable set. Addition of the live set for basic block 238, the child of basic block 222, adds the variable $X_5$ to the live set of block 222.

Consideration of the live variable set for basic block 238 is also helpful in illustrating the backwards dataflow process of the invention. In the first iteration, the only variables used in block 228, variables $X_2$ and $X_4$, were arguments of a phi function, and are therefore ignored. Since the variable $X_5$ was only "defined" in block 228, it also was not added to the live variable set of block 228 in the first iteration of the process. Adding the live variable set of basic block 222, the child of block 228, in the second iteration of the process the variable $X_5$ is now first added to the live variable set of block 228, but then removed from the live set since variables that are initially added to the live set because of a "use" are then deleted if subsequently "defined" within the basic block. Since the dataflow analysis is performed backwards, the definition of the variable $X_5$ in basic block 228 is subsequent to the addition of the variable $X_5$ provided by adding the live variable set of the child block 222. Continuing, the live variable set of basic block 218 remains unchanged and an empty set in the second iteration of the process. Although variable $X_2$ in the live set of basic block 234 is first added to the live set of block 218, it is then removed because of the subsequent definition of the variable $X_2$ in block 218. The variable $X_4$ is similarly first added to the live set of basic block 219 (since it is in the live set of block 233, the child of block 219) but then removed from the live set because of the subsequent definition of the variable $X_4$ in block 219.

Comparing the live variable sets of the various basic blocks shown in FIGS. 10A and 10B, it can be seen that changes in the live variable sets occur in both basic blocks 216 and 222. As noted above the variable $X_5$ was added to the live set of block 222 when the variables in the live set of block 238, the child of block 222, were considered in the analysis of block 222. Similarly, the first iteration of the process yielded an empty set for block 216 since no variables are used in block 216. In the second iteration, however, the variables in the live sets of the child blocks of block 216 (blocks 218 and 219) were considered. Although block 218 has an empty live variable set, the live variable set of block 219 includes the variable $X_2$.

In accordance with yet another aspect of the invention, the step of determining the live variable sets for each of the basic blocks in the control flow graph is iteratively repeated until the results remain unchanged. In each of the later iterations, the union of the live variable sets for the child blocks are again considered in the determination of the live set for the parent block. In the example presented above the live variable sets for blocks 216 and 222 were altered between the first and second iterations. Thus the process is repeated in a third iteration. In FIG. 10C there is shown the live sets for each of basic blocks 212–238 in control flow graph 230 after performing a third iteration of the backward dataflow process presented above. By comparing FIGS. 10B and 10C, it can be seen that none of the live variable sets have changed between the second and third iterations for any of the basic blocks 212–238. The process of determining the live variable set is therefore completed.

With the determination of the live variable set for the basic block in the program, a variety of register allocation and variable prioritization techniques may be employed to avoid spill-over. As noted above spill-over occurs when the number of variables that must be manipulated during the execution of the program exceeds the number of registers in the CPU.

As an alternative technique for register allocation, execution of the program may be divided so that a program portion having a live variable set of fewer members than the number of CPU registers may first be executed and then a reallocation of CPU registers may subsequently be performed before the next portion of the program is executed. The present invention thus provides more efficient process for avoiding spill-over and for speeding up the execution of target computer programs. The execution of the variable prioritization and register allocation processes, such as those involving graph coloring may be performed by the computer illustrated in FIG. 1. In this instance the live variable sets determined in accordance with the process of the invention may be stored in memory 4.

It will be appreciated by those skilled in the art that various modifications and alterations may be made in the preferred embodiments of the invention disclosed herein without departing from the scope of this invention. Accordingly, the scope of the invention is not to be limited to the particular invention embodiments discussed above, but should be defined only by the claims set forth below and equivalents thereof.

What is claimed is:

1. A computer system having a central processing unit (CPU) and random access memory (RAM) coupled to said CPU, for use in compiling a target program to run on a target computer architecture having a fixed number of CPU registers, said target program having at least one basic block and wherein "use" blocks are inserted in a control flow graph which inhibit needless variable spilling to memory, said computer system comprising:

a compiler system resident in said computer system having a front end compiler, a code optimizer and a back end code generator; and said code optimizer configured to determine a set of live variables for said basic block in said target program, wherein said fixed number of CPU registers in said target computer architecture can be allocated to said set of live variables in a manner which minimizes a number of variables in said set of live variables that must be stored in said memory instead of in said fixed number of CPU registers, wherein said code optimizer inserts, in at least a portion of a control flow graph, a dummy block representing usage of a variable in said control flow graph prior to a phi-function node and determines said set of live variables by considering said dummy block, and wherein said code optimizer is further configured to perform a static single assignment transform on said target program and to add said phi function node to said control flow graph representation of said target program, and wherein said dummy block is a use block.

2. The computer system of claim 1 wherein said code optimizer is further configured to determine said set of live variables by using a backward dataflow analysis in which said variable is an argument in said phi function node and said variable is not considered as a use within said phi function node.

3. The computer system of claim 2 wherein said backward dataflow analysis is performed by beginning at an end of said basic block and adding to said set of live variables those variables live at a beginning of one or more children blocks of said basic block and adding to said set of live variables each usage instance of said variable and deleting from said set of live variables each subsequent definition of said variable.

4. The computer system of claim 3 wherein said backward dataflow analysis is iteratively performed until said set of live variables for said basic block remains constant between successive iterations.

5. The computer system of claim 1 wherein said phi function is added to said control flow graph representation of said target program by said code optimizer whenever multiple definitions of said variable reach a use of that variable.

6. The computer system of claim 5 wherein said dummy block is inserted into said control flow graph between said phi function having said variable in its argument and a preceding block containing a definition of said variable.

7. A compiler system for compiling a target program to run on a target computer architecture having a memory and a plurality of CPU registers, said compiler system comprising:

a front end portion configured to accept source code of said target program as input and to output a corresponding intermediate code set;

a code optimizer portion coupled to said front end portion and configured to accept said intermediate code set as input and to output a second intermediate code set, wherein said second intermediate code set comprises code for said target program that allocates said plurality of CPU registers of said target computer architecture to a set of live variables for basic blocks in said target program in a manner which minimizes a number of variables in said set of live variables that must be stored in said memory instead of in said plurality of CPU registers, wherein said code optimizer inserts, in at least a portion of a control flow graph, a dummy block representing usage of a variable in said control flow graph prior to a phi-function node and determines said set of live variables by considering said dummy block; wherein said code optimizer is further configured to perform a static single assignment transform on said target program, and to add said phi function node to said control flow graph representation of said target program and wherein said dummy block is a use block; and a back end code generator portion coupled to said code optimizer configured to accept said second intermediate code set as input and to generate binary code which will run on said target computer architecture.

8. The compiler system of claim 7 wherein said code optimizer is further configured to determine said set of five variables by using a backward dataflow analysis in which said variable is an argument in said phi function node and said variable is not considered as a use within said phi function node.

9. The compiler system of claim 8 wherein said backward dataflow analysis is performed by beginning at an end of said basic block and adding to said set of live variables those variables live at a beginning of one or more children blocks of said basic block and adding to said set of live variables each usage instance of said variable and deleting from said set of live variables each subsequent definition of said variable.

10. The compiler system of claim 9 wherein said backward dataflow analysis is to be iteratively performed until said set of live variables for said basic block remains constant between successive iterations.

11. The computer system of claim 7 wherein said phi function is added to said control flow graph representation of said target program by said code optimizer whenever multiple definitions of said variable reach a use of that variable.

12. The computer system of claim 11 wherein said dummy block is inserted into said control flow graph between said phi function having said variable in its argument and a preceding block containing a definition of said variable.

13. A code optimizer for use in an compiler system for compiling a target program to run on a target computer architecture having a memory and a plurality of CPU registers, said code optimizer comprising:

a first portion configured to accept as input an intermediate code representation of said target program;

a second portion, coupled to said first portion, configured to determine a set of live variables for at least one basic block of said target program; and a third portion, coupled to said second portion, configured to allocate said plurality of CPU registers of said target computer architecture to said set of live variables for said basic blocks of said target program in a manner that minimizes a number of variables in said set of live variables that must be stored in said memory instead of in said plurality of CPU registers, wherein said third portion inserts, in at least a portion of a control flow graph, a dummy block representing usage of a variable in said control flow graph prior to a phi-function node and determines said set of live variables by considering said dummy block, wherein the third portion is further configured to perform a static single assignment transform on said target program and to add said phi function node to said control flow graph representation of said target program, and wherein said dummy block is a use block.

14. The code optimizer of claim 13 wherein said third portion is further configured to determine said set of live variables by using a backward dataflow analysis in which said variable is an argument in said phi function node and said variable is not considered as a use within said phi function node.

15. The code optimizer of claim 14 wherein said backward dataflow analysis is performed by beginning at an end of said basic block and adding to said set of live variables those variables live at a beginning of one or more children blocks of said basic block and adding to said set of live variables each usage instance of said variable and deleting from said set of live variables each subsequent definition of said variable.

16. The code optimizer of claim 15 wherein said backward dataflow analysis is iteratively performed until said set of live variables for said basic block remains constant between successive iterations.

17. The computer system of claim 13 wherein said phi function is added to said control flow graph representation of said target program by said third portion whenever multiple definitions of said variable reach a use of that variable.

18. The computer system of claim 17 wherein said dummy block is inserted into said control flow graph between said phi function having said variable in its argument and a preceding block containing a definition of said variable.

19. A computer controlled method of allocating a live set of variables in a target program to a fixed number of CPU registers in a target computer architecture in a manner that minimizes a number of variables in said live set of variables that must be stored in a memory instead of in said fixed number of CPU registers; said target program having at least one basic block said method comprising steps of:
   a) constructing an interference graph representing a procedure of said target program;
   b) determining said live set of variables for said target program by sub-steps of:
      b1) performing a static single assignment transform of said procedure of said target program, including a step of adding a phi function to a control flow graph of said target program;
      b2) inserting a use block representative of a use of a variable in said control flow graph between said phi function and a block containing a definition of said variable; and
      b3) determining said live set of variables for said basic block in said target program by a backward dataflow analysis of said control flow graph without including arguments of said phi function wherein said backward dataflow analysis is performed beginning at an end of said basic block, initially adding to said live set of variables those variables live at a beginning of one or more children blocks of said basic block and adding to said live set of variables each instance of a use of a variable and deleting from said live set of variables each subsequent definition of said variable; and
   c) mapping said live set of variables to said fixed number of CPU registers.

20. The method of claim 19 wherein the backward dataflow analysis is iteratively performed until said live set of variables remain constant between successive iterations.

21. The method of claim 19 wherein said phi function is added to said control flow graph where multiple definitions of said variable reach a use of that variable.

22. A computer controlled method of optimizing binary code of a target program which is compiled to run on a target computer architecture having a memory and a fixed number of CPU registers, said method comprising steps of:
   a) providing a compiler system configured to accept source code of said target program and to output binary code representing said target program which is capable of being processed on said target computer architecture, said compiler system comprising a front end portion, a code optimizer portion and a back end code generator;
   b) providing said code optimizer portion of said compiler system configured to accept intermediate code from said front end portion of said compiler system and to allocate a live set of variables in said intermediate code representing said target program to said fixed number of CPU registers in said target computer architecture in a manner that minimizes a number of variables in said live set of variables that must be stored in said memory instead of in said fixed number of CPU registers,
   wherein allocation of said live set of variables in said intermediate code representing said target program to said fixed number of CPU registers is performed by sub-steps:
      (b1) constructing an interference graph representing a procedure of said target program; determining said live set of variables for said target program by sub-steps of:
         (b1a) performing a static single assignment transform of said procedure of said target program, including adding a phi function to a control flow graph of said target program;
         (b1b) inserting a use block representing usage of a variable in said control flow graph between said phi function and a defining block containing a definition of said variable; and
         (b1c) determining said live set of variables for basic blocks in said target program by a backward dataflow analysis of said control flow graph;
      (b2) mapping said live set of variables to said fixed number of CPU registers; and
   (c) outputting a second intermediate code version of said target program to said back end code generator, said second intermediate code version of said target program containing the allocation of said live set of variables in said target program to said fixed number of CPU registers in said target computer architecture in a manner that minimizes a number of variables in said live set of variables that must be stored in said memory instead of in said fixed number of CPU registers, whereby said target program binary code is optimized.

* * * * *